United States Patent
Salter et al.

(10) Patent No.: US 9,707,887 B1
(45) Date of Patent: Jul. 18, 2017

(54) VEHICLE MIRROR ASSEMBLY

(71) Applicant: Ford Global Technologies, LLC, Dearborn, MI (US)

(72) Inventors: Stuart C. Salter, White Lake, MI (US); Annette Lynn Huebner, White Lake, MI (US); James J. Surman, Clinton Township, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/297,430

(22) Filed: Oct. 19, 2016

(51) Int. Cl.
| | | |
|---|---|---|
| *B60Q 1/00* | (2006.01) | |
| *B60Q 1/26* | (2006.01) | |
| *B60Q 3/02* | (2006.01) | |
| *B60J 1/20* | (2006.01) | |
| *B60Q 3/00* | (2017.01) | |
| *B60Q 3/50* | (2017.01) | |
| *B60Q 3/252* | (2017.01) | |
| *B60Q 3/20* | (2017.01) | |
| *B60Q 3/54* | (2017.01) | |
| *B60Q 3/68* | (2017.01) | |
| *B60Q 3/233* | (2017.01) | |
| *B60Q 3/51* | (2017.01) | |
| *B60Q 3/57* | (2017.01) | |

(52) U.S. Cl.
CPC .......... *B60Q 3/0226* (2013.01); *B60J 1/2036* (2013.01); *B60Q 3/00* (2013.01); *B60Q 3/0223* (2013.01); *B60Q 3/0266* (2013.01); *B60Q 3/20* (2017.02); *B60Q 3/233* (2017.02); *B60Q 3/252* (2017.02); *B60Q 3/50* (2017.02); *B60Q 3/51* (2017.02); *B60Q 3/54* (2017.02); *B60Q 3/57* (2017.02); *B60Q 3/68* (2017.02); *B60Q 2500/00* (2013.01)

(58) Field of Classification Search
CPC . B60Q 3/00; B60Q 3/20; B60Q 3/233; B60Q 3/252; B60Q 3/50; B60Q 3/51; B60Q 3/54; B60Q 3/57; B60Q 3/68; B60J 1/2036
USPC ................... 362/488, 490, 509–514
See application file for complete search history.

(56) References Cited

U.S. PATENT DOCUMENTS

| | | | |
|---|---|---|---|
| 4,818,007 | A | 4/1989 | Mahoney |
| 5,053,930 | A | 10/1991 | Benavides |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,419,854 | B1 | 7/2002 | Yocom et al. |
| 6,494,490 | B1 | 12/2002 | Trantoul |
| 6,569,786 | B1 | 5/2003 | Marsh |
| 6,577,073 | B2 | 6/2003 | Shimizu et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A vehicle provides a seating assembly including a retaining member. A headliner is positioned above the seating assembly. A mirror assembly is positioned within the headliner including a roller. A shade is coupled to the roller and deployable from the headliner. A mirror is positioned on the shade. An engaging member is coupled to the shade and a light source is positioned on the shade.

20 Claims, 9 Drawing Sheets

(56) References Cited

U.S. PATENT DOCUMENTS

| | | | |
|---|---|---|---|
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,776,211 B2 | 8/2004 | Schlecht et al. |
| 6,820,888 B1 | 11/2004 | Griffin |
| 6,851,840 B2 | 2/2005 | Ramamurthy et al. |
| 6,859,148 B2 | 2/2005 | Miller et al. |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,128,439 B2 | 10/2006 | Winsor |
| 7,161,472 B2 | 1/2007 | Strumolo et al. |
| 7,213,923 B2 | 5/2007 | Liu et al. |
| 7,216,917 B2 | 5/2007 | Tadakamalla |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,717,158 B2 | 5/2010 | Lekar et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,652,641 B2 | 2/2014 | Wang et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2002/0195843 A1 | 12/2002 | Glasl |
| 2003/0167668 A1 | 9/2003 | Fuks et al. |
| 2003/0179548 A1 | 9/2003 | Becker et al. |
| 2004/0120045 A1 | 6/2004 | Haines |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0224831 A1 | 9/2010 | Woo et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

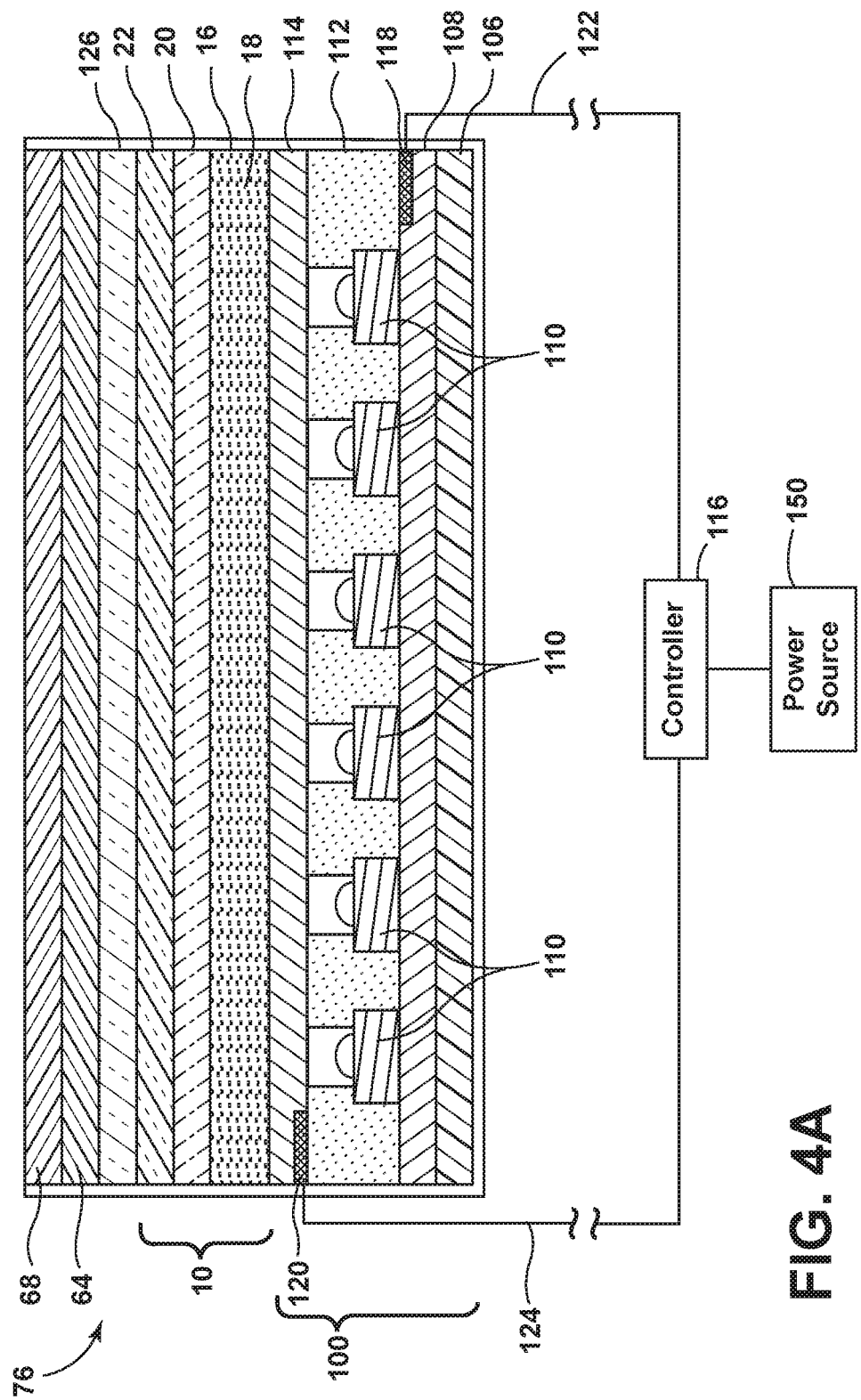

VEHICLE MIRROR ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, a vehicle provides a seating assembly including a retaining member. A headliner is positioned above the seating assembly. A mirror assembly is positioned within the headliner including a roller. A shade is coupled to the roller and deployable from the headliner. A mirror is positioned on the shade. An engaging member is coupled to the shade and a light source is positioned on the shade.

According to another aspect of the present disclosure, a vehicle providing a seating assembly including a retaining member. A headliner is positioned above the seating assembly. A mirror assembly is positioned within the headliner including a roller. A shade is coupled to the roller and deployable from the headliner. An engaging member is coupled to the shade and configured to engage the retaining member. A mirror is positioned on the shade.

According to yet another aspect of the present disclosure, a vehicle includes a headliner. A mirror assembly is positioned within the headliner including a roller. A shade is coupled to the roller and deployable from the headliner. A mirror is positioned on the shade and a light source is positioned on the shade.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is an enhanced view taken at section IVA of FIG. 3 illustrating a light source according to one example;

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1A:
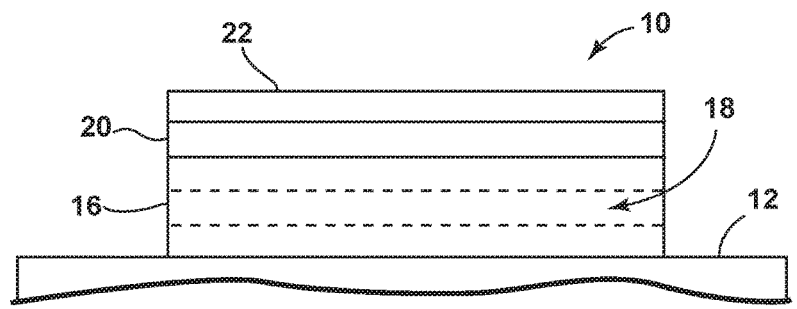
FIG. 1 A is a side view of a photoluminescent structure rendered as a coating for use in a trim assembly according to one embodiment.
FIG. 1B is a top view of a photoluminescent structure rendered as a discrete particle according to one embodiment.
FIG. 1C is a side view of a plurality of photoluminescent structures rendered as discrete particles and incorporated into a separate structure.
Figure 1B:
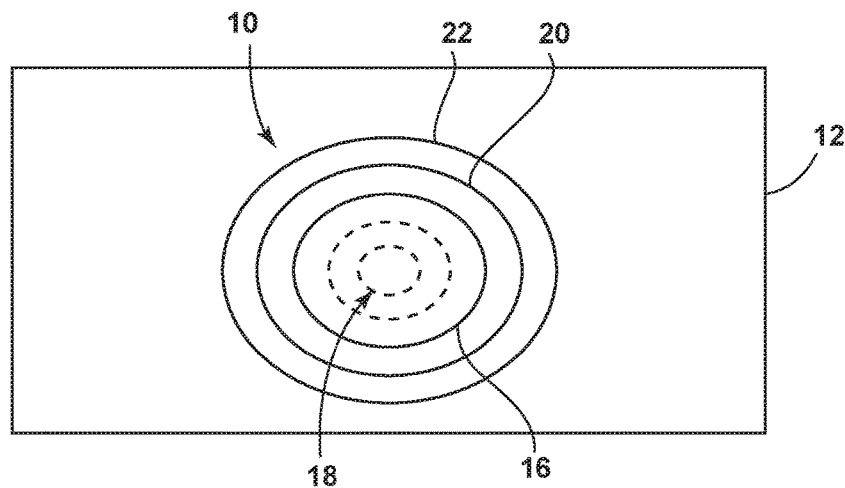
Figure 1C:
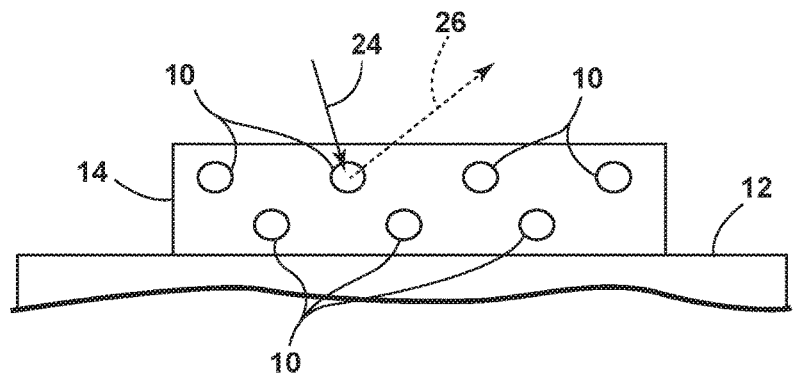

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source 76 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/$m^2$. A visibility of 0.32 mcd/$m^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 76 and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 76). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 76 that emits the excitation light 24, including, but not limited to, natural light sources (e.g., the sun) and/or any artificial light source 76. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2A:
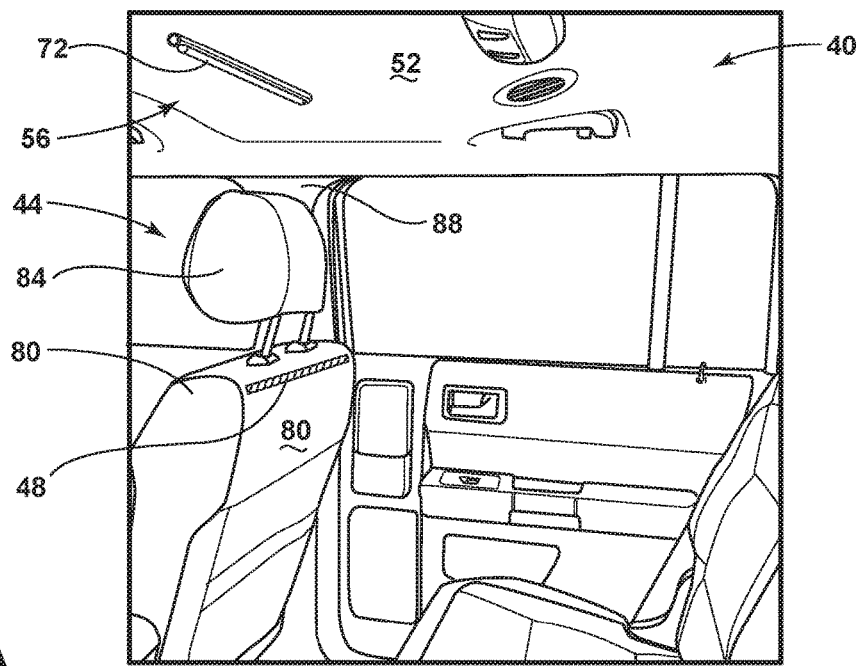
FIG. 2A is perspective view of a mirror assembly of a vehicle in an undeployed position, according to one example.
Figure 2B:
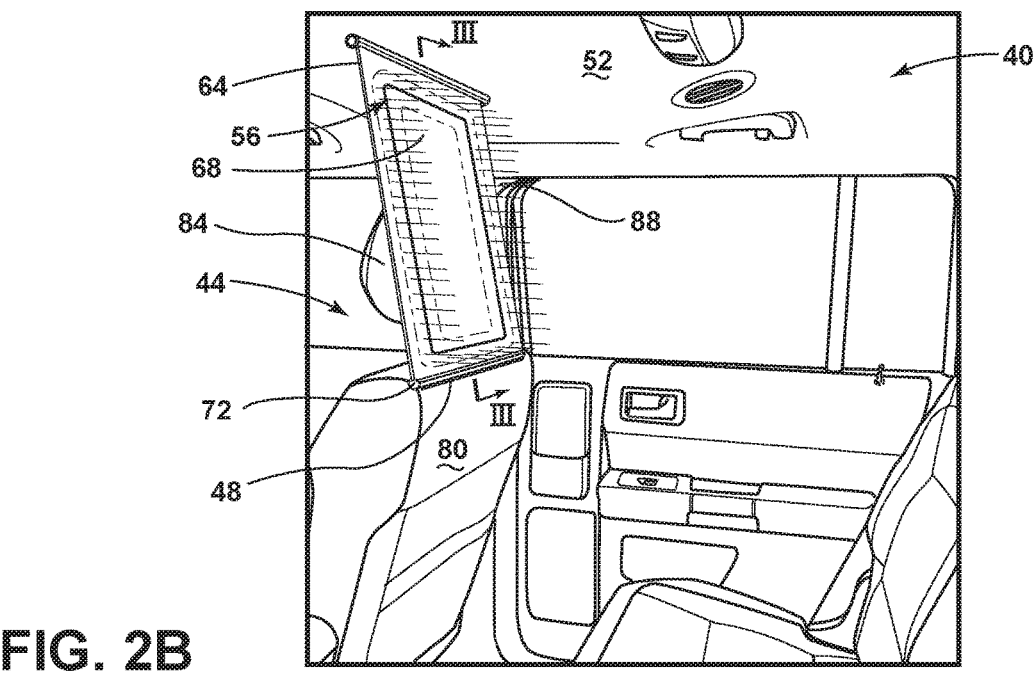
FIG. 2B is perspective view of a mirror assembly of a vehicle in a deployed position, according to one example.
Figure 2C:
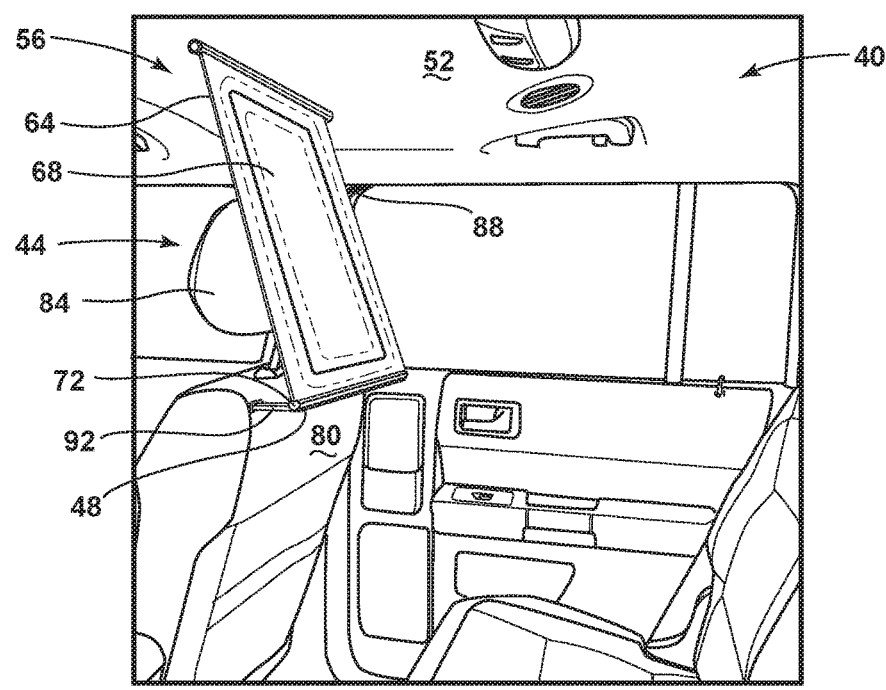
FIG. 2C is perspective view of a mirror assembly in a deployed position with a retaining member in a deployed position, according to one example.
Figure 3:
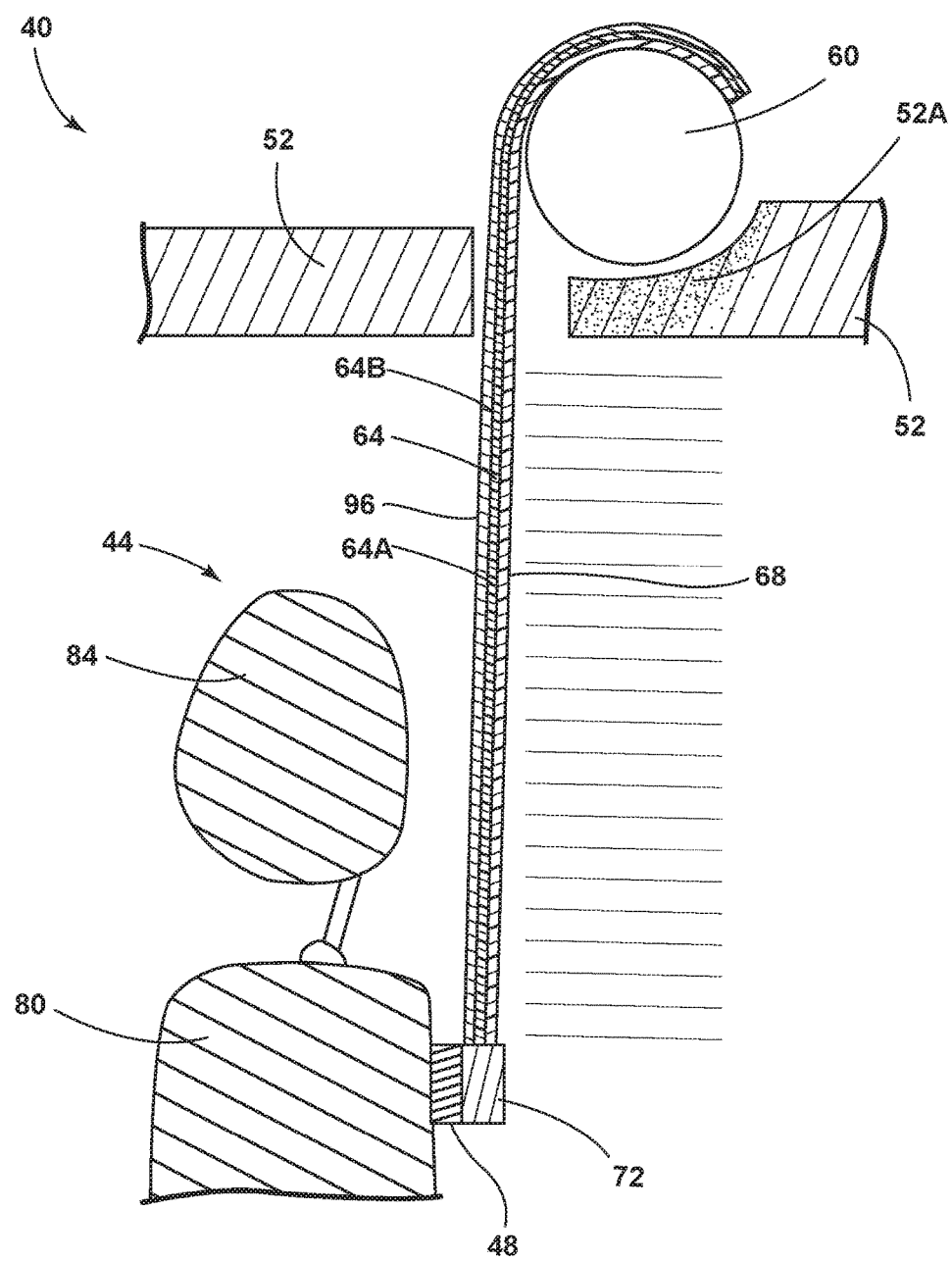
FIG. 3 is a cross-sectional view taken at line III of FIG. 2B, according to one example.

Referring now to FIGS. 2A-3, depicted is a vehicle 40 including a seating assemble 44 having a retaining member 48. A headliner 52 is positioned above the seating assembly 44. A mirror assembly 56 is positioned within the headliner 52. The mirror assembly 56 includes a roller 60 and a shade 64 coupled to the roller 60. The shade 64 is deployable from the headliner 52. A mirror 68 is positioned on the shade 64. An engaging member 72 is coupled to the shade 64. A light source 76 is also positioned on the shade 64.

The mirror assembly 56 is configured to allow the shade 64 to extend from the headliner 52 from an undeployed position (FIG. 2A) to a deployed position (FIG. 2B). Although depicted in a second row seating position, it will be understood that the mirror assembly 56 may be employed in a first row seating position (e.g., for a front seat passenger) and/or in a third row seating position. Further, multiple mirror assemblies 56 may be employed within the vehicle 40. Positioned at the bottom of the shade 64 is the engaging member 72. The engaging member 72 extends across a width of the shade 64 and is configured to couple with the retaining member 48 of the seating assembly 44. The engaging member 72, although depicted as extending across the width of the shade 64, may alternatively be a single or a plurality of engagement members positioned along a bottom of the shade 64. The engaging member 72 may be overmolded onto the shade 64. Extending the engaging member 72 along the width of the shade 64 may be advantageous in stiffening the shade 64 such that wrinkles and creases in the shade 64 or mirror 68 are minimized and during and after repeated use.

The shade 64 of the mirror assembly 56 is held in place in the deployed position by the retaining member 48. In the depicted example, the retaining member 48 is positioned on a seatback 80 of the seating assembly 44, but it will be understood that the retaining member 48 may be positioned in a variety of locations. For example, the retaining member 48 may be positioned on a headrest 84 of the seating assembly 44, on a B-pillar 88 of the vehicle 40 and/or in a variety of positions configured to hold the shade 64 in the deployed position. Further, the vehicle 40 may include multiple retaining members 48. The engaging member 72 may couple with the retaining member 48 through a variety of manors. For example, the engaging member 72 may define a plurality of hooks configured to couple with a plurality of eyelets of the retaining member 48 (e.g., or vice versa). In another example, a single elongated ledge may be defined by the engaging member 72 to engage one or a plurality of lips defined by the retaining member 48. Additionally or alternatively, the engaging member 72 and the retaining member 48 may be coupled by a magnetic or electrical attraction. According to various examples, the retaining member 48 is also operable between an undeployed position (FIG. 2B) and a deployed position (FIG. 2C). In such examples, the retaining member 48 may extend in a vehicle rearward direction when in the deployed position. According to one example, the retaining member 48 may be positioned on a rail system 92 which may allow the retaining member 48 to deploy from the seating assembly 44. Use of a deployable example of the retaining member 48 may be advantageous in changing an angle at which the mirror 68 is viewed by an occupant of the vehicle 40. For example, deployment of the retaining member 48 may change the angle at which the mirror 68 is viewed by greater than about 5°, 10°, 15° or greater than about 25°.

The roller 60 is positioned within the headliner 52 of the vehicle 40. The roller 60 may be torsionaly biased by a spring or the like to generate a tension acting on the shade 64 in the deployed position. The tension generated by the roller 60 on the shade 64 may keep the shade 64 and the mirror 68 taught while in the deployed position. Further, when the shade 64 and the mirror 68 are in the undeployed position (i.e., in the headliner 52) the engaging member 72 may be held tightly against the headliner 52 by the tension of the roller 60 to prevent rattling while the vehicle 40 is in motion. The shade 64 may be wound around the roller 60. The shade 64 may have a first side 64A that is on the roller 60 side and a second side 64B which may extend away from the roller 60 when the shade 64 is moved from the undeployed position to the deployed position. According to various examples, the roller 60 may be dampened to prevent the shade 64 and mirror 68 from quickly retracting to the undeployed position due to an unexpected decoupling of the engaging member 72 from the retaining member 48 (e.g., due to motion of the vehicle 40).

Referring now to FIGS. 2C and 3, as explained above, the roller 60 is positioned within the headliner 52. The headliner 52 may be a polymeric material, such as a glass mat thermoplastic, or other suitable material. The headliner 52 defines a compressed region 52A proximate the roller 60. The compressed region 52A of the headliner 52 may be compressed down to between about 1 mm to about 5 mm in thickness as compared to the rest of the headliner 52 which may have a thickness ranging from between about 10 mm to about 20 mm. Such a compressed region 52A of the headliner 52 may be advantages in allowing the largest possible roller 60 to be introduced in the headliner 52. By utilizing the largest roller 60 possible, stress and fatigue on the shade 64 may be reduced through repeated cycles between the undeployed and deployed positions.

In the depicted example, the first side 64A of the shade 64 includes the mirror 68 and the second side 64B includes the light source 76 and a stiffening film 96. The shade 64 may be composed of a metal or polymeric material as either a film, a mesh, and/or combinations thereof. The shade 64 is flexible such that in the undeployed position the shade 64 may be wound around the roller 60 while in the deployed position remaining flexible enough to be taught by the tension of the roller 60. The mirror 68 is composed of a reflective material such as a metal foil, a vacuum metalized layer, or other suitably reflective surface materials. In vacuum metalized layer examples of the mirror 68, the vacuum metalized layer may be between about 20 μm and about 2000 μm thick. As with the shade 64, the mirror 68 should be suitably flexible such that it may be round around the roller 60 in the undeployed position. The mirror 68 may extend across the entirety of the first surface 64A, or may extend over a portion. For example, the mirror 68 may be located in a center of the first surface 64A such that a perimeter of the shade 64 is defined or such that various patterns may be formed from the mirror 68. According to various examples, the mirror 68 may be partially transmissive and partially reflective such that the mirror 68, at least in portions, is transflective. Examples where the mirror 68 is transflective may be advantageous in concealing the light source 76 on the other side of the shade 64 when light is not being passed through the mirror 68. In other words, the reflectivity of the mirror 68 may prevent the light source 76 from being observed when the light source 76 is not emitting light. It will be understood that the shade 64 and the mirror 68 may be integrated into a single structure such as a vacuumized film.

Position on the second side 64B of the shade 64 is the light source 76. It will be understood that in alternate examples, the light source 76 may be positioned on the first side 64A between the mirror 68 and the shade 64. The light source 76 is configured to emit light in a vehicle rearward direction through the shade 64 and/or through the mirror 68. According to other examples, the light source 76 may also be configured to emit light in a vehicle forward direction for such uses as dome lighting, accessory lighting and ambient lighting. The light source 76 may be configured to emit a variety of colors and color temperatures of light. For example, the light source 76 may emit colored light such as red, blue, yellow, or combinations thereof. Further, the light source 76 may be configured to have a variety of lighting settings. For example, the lighting settings may replicate various lighting conditions (e.g., office, night club, natural daylight, etc.) not found within the vehicle 40. The light source 76 may be coupled to the second side 64B through an adhesive, heat staking and/or other forms of joining. In adhesive examples, the adhesive may be optically clear or may impart a tint to the light emitted from the light source 76. In examples where non-optically clear adhesives are utilized, the light source 76 may or may not compensate for the tinting by altering the color of light emitted from the light source 76 (e.g., by LED binning). The light source 76 may be sealed by the stiffening film 96. The stiffening film 96 may be a polymeric or elastomeric material having a thickness of between about 5 mm to about 20 mm. The stiffening film 96 is constructed such that it provides stiffness and rigidity to the shade 64 while also being flexible enough to be wound around the roller 60. Use of the stiffening film 96 may prevent wrinkles and creases from forming in the shade 64 and mirror 68.

Figure 4B:
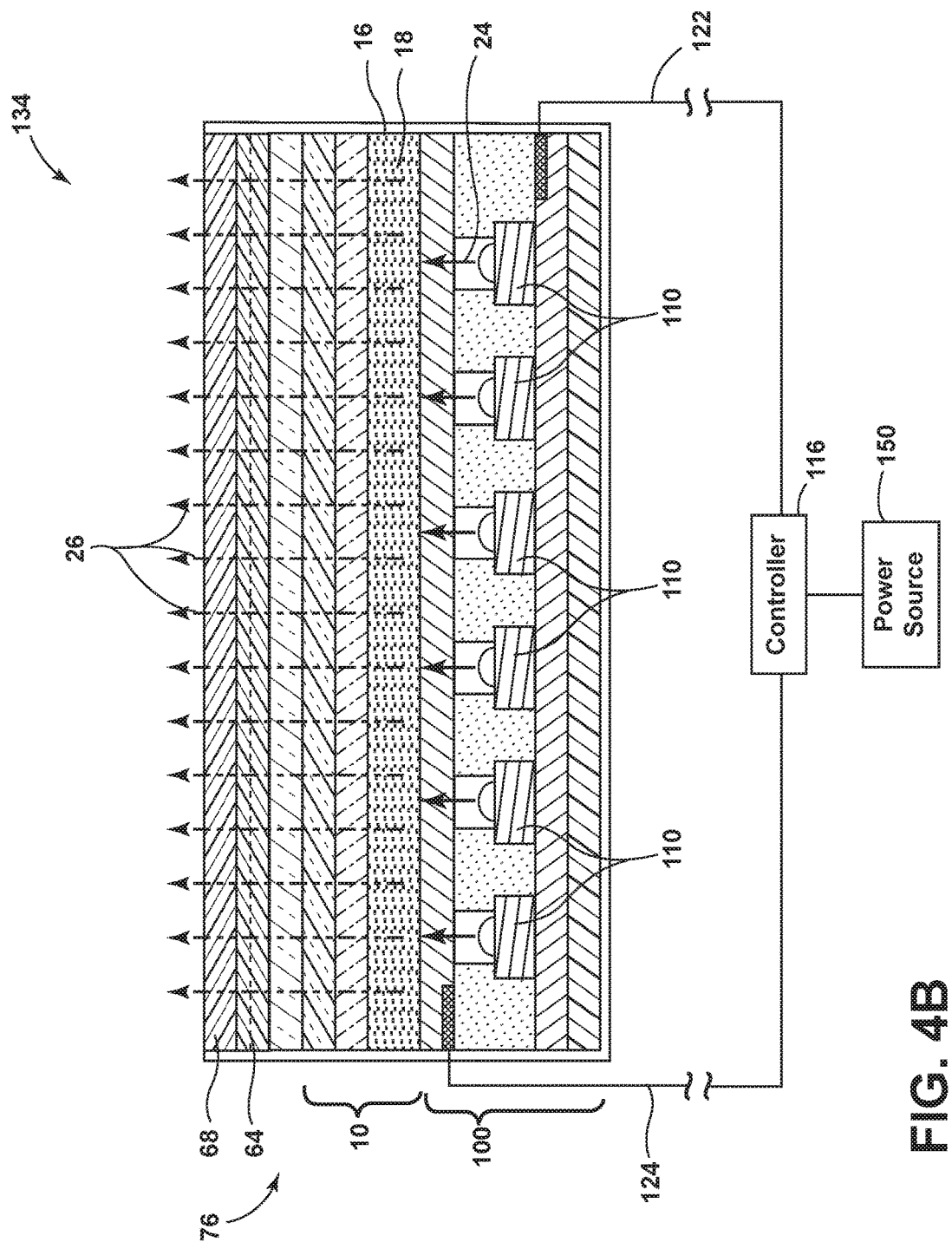
FIG. 4B is an enhanced view taken at section IVB of FIG. 3 illustrating a light source according to one example.

Referring to FIGS. 4A-4E, a cross-sectional view of the light source 76 capable of use with the external photoluminescent structure 10 is shown according to one embodiment. As illustrated in FIG. 4A, the light source 76 may have a stacked arrangement that includes a light-producing assembly 100 and the photoluminescent structure 10. The light-producing assembly 100 may correspond to a thin-film or printed light emitting diode (LED) assembly and includes a substrate 106 as its lowermost layer. The substrate 106 may include a polycarbonate, poly-methyl methacrylate (PMMA), or polyethylene terephthalate (PET) material on the order of 0.005 to 0.060 inches thick. The substrate 106 may correspond to the stiffening film 96 or another layer proximate the stiffening film 96.

The light-producing assembly 100 includes a positive electrode 108 arranged over the substrate 106. The positive electrode 108 includes a conductive epoxy such as, but not limited to, a silver-containing or copper-containing epoxy. The positive electrode 108 is electrically connected to at least a portion of a plurality of LED sources 110 arranged within a semiconductor ink 112 and applied over the positive electrode 108. Likewise, a negative electrode 114 is also electrically connected to at least a portion of the LED sources 110. The negative electrode 114 is arranged over the semiconductor ink 112 and includes a transparent or translucent conductive material such as, but not limited to, indium tin oxide. Additionally, each of the positive and negative electrodes 108, 114 are electrically connected to a controller 116 and a power source 150 via a corresponding bus bar 118, 120 and conductive leads 122, 124. The bus bars 118, 120 may be printed along opposite edges of the positive and negative electrodes 108, 114 and the points of connection between the bus bars 118, 120 and the conductive leads 122, 124 may be at opposite corners of each bus bar 118, 120 to promote uniform current distribution along the bus bars 118, 120. It should be appreciated that in alternate embodiments, the orientation of components within the light-producing assembly 100 may be altered without departing from the concepts of the present disclosure. For example, the negative electrode 114 may be disposed below the semiconductor ink 112 and the positive electrode 108 may be arranged over the aforementioned semiconductor ink 112. Likewise, additional components, such as the bus bars 118, 120 may also be placed in any orientation such that the light-producing assembly 100 may emit converted light 26 towards a desired location.

The LED sources 110 may be dispersed in a random or controlled fashion within the semiconductor ink 112 and may be configured to emit focused or non-focused light toward the second photoluminescent structure 74. The LED sources 110 may correspond to micro-LEDs of gallium nitride elements on the order of about 5 to about 400 microns in size and the semiconductor ink 112 may include various binders and dielectric material including, but not limited to, one or more of gallium, indium, silicon carbide, phosphorous, and/or translucent polymeric binders.

The semiconductor ink 112 can be applied through various printing processes, including ink jet and silk screen processes to selected portion(s) of the positive electrode 108. More specifically, it is envisioned that the LED sources 110 are dispersed within the semiconductor ink 112, and shaped and sized such that a substantial quantity of the LED sources 110 (e.g., over 50%) align with the positive and negative electrodes 108, 114 during deposition of the semiconductor ink 112. The portion of the LED sources 110 that ultimately are electrically connected to the positive and negative electrodes 108, 114 may be illuminated by a combination of the bus bars 118, 120, controller 116, power source 150, and conductive leads 122, 124. Additional information regarding the construction of light-producing assemblies is disclosed in U.S. Pat. No. 9,299,887 to Lowenthal et al. entitled "ULTRA-THIN PRINTED LED LAYER REMOVED FROM SUBSTRATE," the entire disclosure of which is incorporated herein by reference.

Referring still to FIG. 4A, the photoluminescent structure 10 is arranged over the negative electrode 114 as a coating, layer, film or other suitable deposition. With respect to the presently illustrated embodiment, the photoluminescent structure 10 may be arranged as a multi-layered structure including the energy conversion layer 16, the optional stability layer 20, and the optional protective layer 22, as described above.

In some embodiments, a decorative layer 126 may be disposed between the shade 64 and the photoluminescent structure 10. However, the decorative layer 126 may be disposed in any other location within the shade 64. The decorative layer 126 may include a polymeric material or any other suitable material and is configured to control or modify an appearance of the light source 76. For example, the decorative layer 126 may be configured to confer a metallic appearance to the light source 76. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. In other embodiments, the decorative layer 126 may be tinted any color to complement the shade 64 structure. In any event, the decorative layer 126 may be at least partially light transmissible such that the converted light 26 is not prevented from illuminating the shade 64.

Referring to FIG. 4B, an energy conversion process 134 for producing single color luminescence is illustrated according to one embodiment. For purposes of illustration, the energy conversion process 134 is described below using the light source 76 depicted in FIG. 4A. In this embodiment, the energy conversion layer 16 of the second photoluminescent structure 74 includes a single photoluminescent material 18, which is configured to convert the excitation light 24 received from LED sources 110 into an converted light 26 having a wavelength different than that associated with the excitation light 24. More specifically, the photoluminescent material 18 is formulated to have an absorption spectrum that includes the emission wavelength of the excitation light 24 supplied from the LED sources 110. The photoluminescent material 18 is also formulated to have a Stokes shift resulting in the visible converted light 26 having an emission spectrum expressed in a desired color, which may vary per lighting application. The visible converted light 26 is outputted from the light source 76 via the shade 64, thereby causing the mirror 68 to illuminate in the desired color. The illumination provided to the mirror 68 and shade 64 may offer a unique, substantially uniform, and/or attractive viewing experience that may be difficult to duplicate through non-photoluminescent means.

Figure 4C:
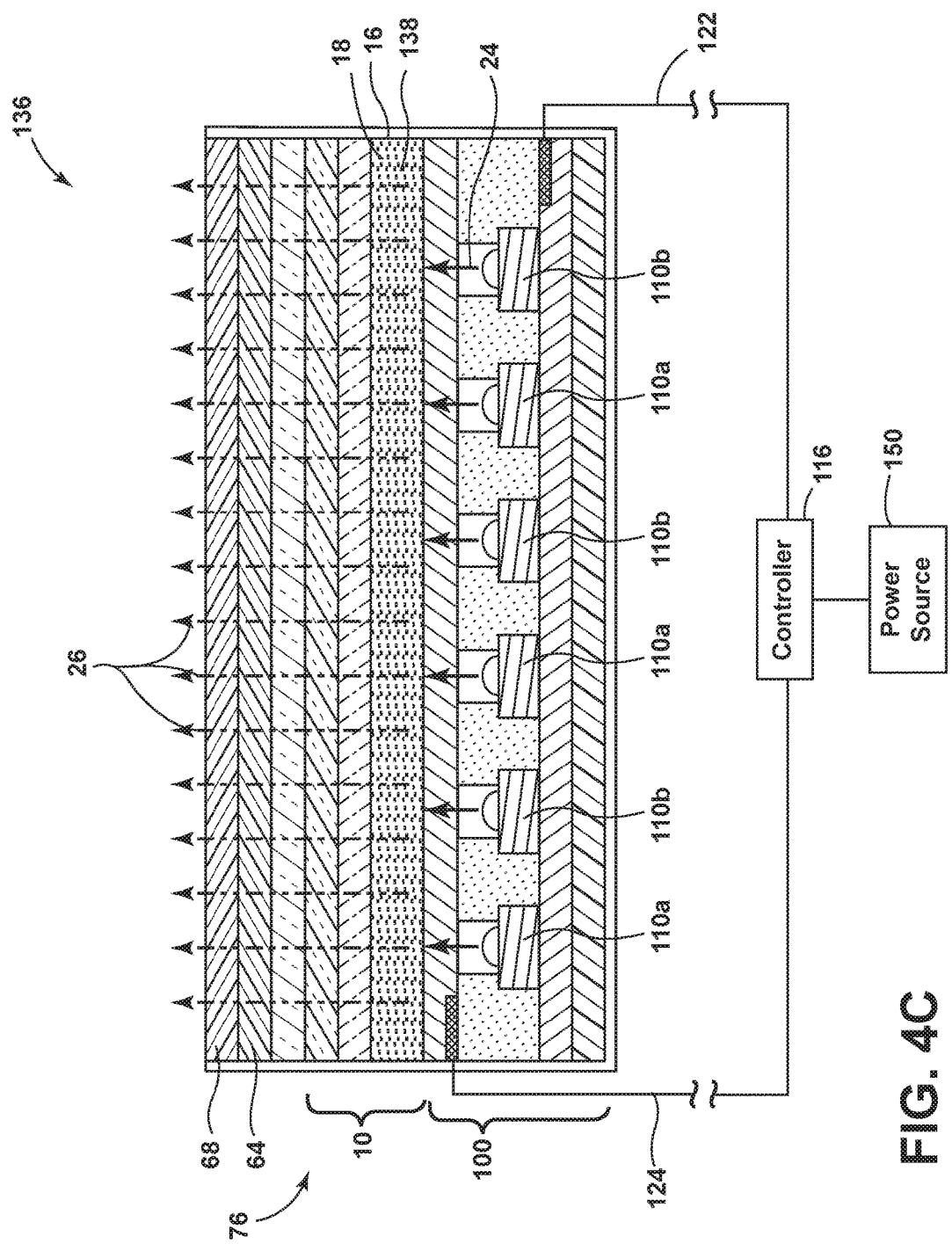
FIG. 4C is an enhanced view taken at section IVC of FIG. 3 illustrating a light source according to one example.

Referring to FIG. 4C, a second energy conversion process 136 for generating multiple colors of light is illustrated according to one embodiment. For consistency, the second energy conversion process 136 is also described below using the light source 76 depicted in FIG. 4A. In this embodiment, the energy conversion layer 16 includes the first and second photoluminescent materials 18, 138 that are interspersed within the energy conversion layer 16. Alternatively, the photoluminescent materials 18, 138 may be isolated from each other if desired. Also, it should be appreciated that the energy conversion layer 16 may include more than two different photoluminescent materials 18 and 138, in which case, the teachings provided below similarly apply. In one embodiment, the second energy conversion process 136 occurs by way of down conversion using blue, violet, and/or UV light as the source of excitation.

With respect to the presently illustrated embodiment, the excitation of photoluminescent materials 18, 138 is mutually exclusive. That is, photoluminescent materials 18, 138 are formulated to have non-overlapping absorption spectrums and Stoke shifts that yield different emission spectrums. Also, in formulating the photoluminescent materials 18, 138, care should be taken in choosing the associated Stoke shifts such that the converted light 26 emitted from one of the photoluminescent materials 18, 138, does not excite the other, unless so desired. According to one exemplary embodiment, a first portion of the LED sources 110, exemplarily shown as LED sources 110*a*, is configured to emit an excitation light 24 having an emission wavelength that only excites photoluminescent material 18 and results in the excitation light 24 being converted into a converted light 26 of a first color (e.g., white). Likewise, a second portion of the LED sources 110, exemplarily shown as LED sources 110*b*, is configured to emit an excitation light 24 having an emission wavelength that only excites second photoluminescent material 138 and results in the excitation light 24 being converted into a converted light 26 of a second color (e.g., red). Preferably, the first and second colors are visually distinguishable from one another. In this manner, LED sources 110*a* and 110*b* may be selectively activated using the controller 116 to cause the second photoluminescent structure 74 to luminesce in a variety of colors. For example, the controller 116 may activate only LED sources 110*a* to exclusively excite photoluminescent material 18, resulting in the mirror 68 illuminating in the first color. Alternatively, the controller 116 may activate only LED sources 110*b* to exclusively excite the second photoluminescent material 138, resulting in the viewable portion 102 illuminating in the second color.

Alternatively still, the controller 116 may activate LED sources 110*a* and 110*b* in concert, which causes both of the photoluminescent materials 18, 138 to become excited, resulting in the viewable portion 102 illuminating in a third color, which is a color mixture of the first and second color (e.g., pinkish). The intensities of the excitation light 24 emitted from each light source 76 may also be proportionally varied to one another such that additional colors may be obtained. For energy conversion layers 16 containing more than two distinct photoluminescent materials 18, a greater diversity of colors may be achieved. Contemplated colors include red, green, blue, and combinations thereof, including white, all of which may be achieved by selecting the appropriate photoluminescent materials 18 and correctly manipulating the corresponding LED sources 110.

Figure 4D:
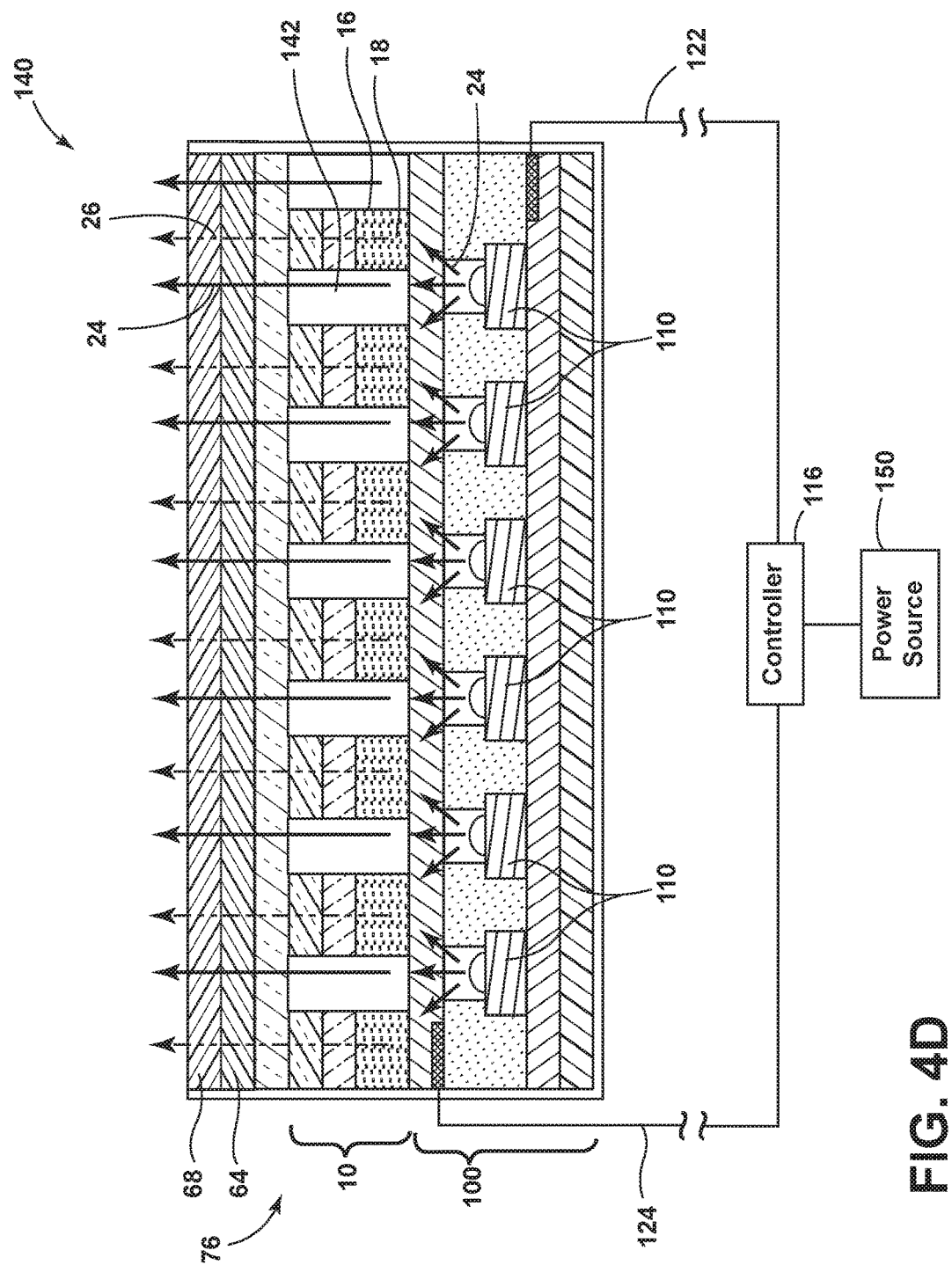
FIG. 4D is an enhanced view taken at section IVD of FIG. 3 illustrating a light source according to one example.

Referring to FIG. 4D, a third energy conversion process 140 includes a light-producing assembly 100, such as the one described in reference to FIG. 4A, and a photoluminescent material 138 disposed thereon is illustrated, according to an alternate embodiment. The photoluminescent material 138 is configured to convert excitation light 24 received from LED sources 110 into a converted light 26 having a wavelength different than that associated with the excitation light 24. More specifically, the second photoluminescent structure 74 is formulated to have an absorption spectrum that includes the emission wavelength of the excitation light 24 supplied from the LED sources 110. The photoluminescent material 18 is also formulated to have a Stokes shift resulting in the converted light 26 having an emission spectrum expressed in a desired color, which may vary per lighting application.

The second photoluminescent structure 74 may be applied to a portion of the light-producing assembly 100, for example, in a stripped manner. Between the photoluminescent structures 10 may be light transmissive portions 142 that allow excitation light 24 emitted from the LED sources 110 to pass therethrough at the first wavelength. The light transmissive portions 142 may be an open space, or may be a transparent or translucent material. The excitation light 24 emitted through the light transmissive portions 142 may be directed from the light-producing assembly 100 towards an additional photoluminescent structure disposed proximate to the light-producing assembly 100. The additional photoluminescent structure may be configured to luminesce in response to the excitation light 24 that is directed through the light transmissive portions 142.

Figure 4E:
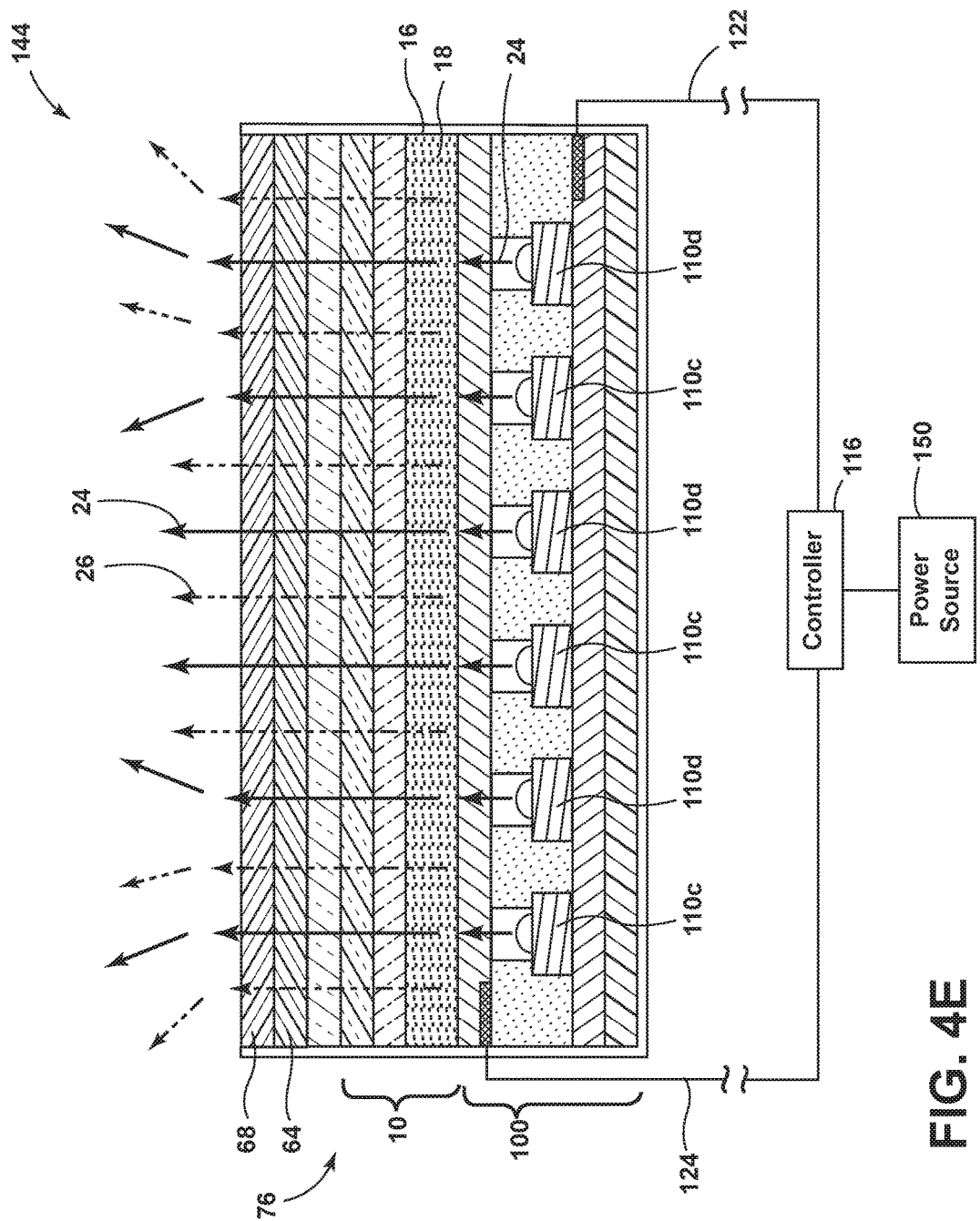
FIG. 4E is an enhanced view taken at section IVE of FIG. 3 illustrating a light source according to one example.

Referring to FIG. 4E, a fourth energy conversion process 144 for generating multiple colors of light utilizing the light-producing assembly 100, such as the one described in reference to FIG. 4A, and a second photoluminescent structure 74 disposed thereon is illustrated. In this embodiment, the second photoluminescent structure 74 is disposed over a top portion of the light-producing assembly 100. The excitation of photoluminescent material 18 is formulated such that a portion of excitation light 24 emitted from the LED sources 110 passes through the second photoluminescent structure 74 at the first wavelength (i.e., the excitation light 24 emitted from the light source 76 is not converted by the second photoluminescent structure 74). The intensity of the outputted light (i.e., the combination of the excitation light 24 and converted light 26) may be modified by pulse-width modulation or current control to vary the amount of excitation light 24 emitted from the LED sources 110 that passes through the second photoluminescent structure 74 without converting to a second wavelength of converted light 26. For example, if the light source 76 is configured to emit excitation light 24 at a low level, substantially all of the excitation light 24 may be converted to converted light 26. In this configuration, a color of converted light 26 corresponding to the second photoluminescent structure 74 may be emitted from the light-producing assembly 100. If the light source 76 is configured to emit excitation light 24 at a high level, only a portion of the first wavelength may be converted by the second photoluminescent structure 74. In this configuration, a first portion of the outputted light may be converted by the second photoluminescent structure 74 and a second portion of the outputted light may be emitted from the light-producing assembly 100 at the first wavelength towards additional photoluminescent structures disposed proximately to the light source 76. The additional photoluminescent structures may luminesce in response to the excitation light 24 emitted from the light source 76.

According to one exemplary embodiment, a first portion of the LED sources 110, exemplarily shown as LED sources 110a is configured to emit an excitation light 24 having a wavelength that excites the photoluminescent material 18 within the second photoluminescent structure 74 and results in the excitation light 24 being converted into a converted light 26 of a first color (e.g., white). Likewise, a second portion of the LED sources 110, exemplarily shown as LED sources 110c, is configured to emit an excitation light 24 having a wavelength that passes through the second photoluminescent structure 74 and excites additional photoluminescent structures disposed proximately to the light source 76 thereby illuminating in a second color. The first and second colors may be visually distinguishable from one another. In this manner, LED sources 110a and 110c may be selectively activated using the controller 116 to cause the light source 76 to luminesce in a variety of colors.

It will be understood that the foregoing description of the light-producing assembly 100 may be applied to form a single continuous light source 76 and/or a plurality of individual light sources 76. In examples where there are a plurality of light sources 76, some or all of the light sources 76 may be independently electrically connected (e.g., through a conductive ink or wires). In independently electrically connected examples of the light sources 76, each of the light sources 76 may be independently addressable, which may allow the controller 116 to create static and dynamic patterns of light on the shade 64 by independently illuminating certain light sources 76 and not others. Further, some, or all, of the light sources 76 may be covered by a single portion of the photoluminescent structure 10. Formation of the plurality of light sources 76 using a plurality of light-producing assemblies 100 may be accomplished in a similar manner to that as described in connection with the lightplate of U.S. Patent Application Publication No. 2015/0136573 filed on Oct. 6, 2014 the disclosure of which is hereby incorporated herein in its entirety. Further, the light producing assembly 100 and/or light source(s) 76 may be formed, and obtain the same or similar advantages as described above, through the placement and securement of a plurality of light sources on a flexible substrate as described in U.S. Patent Application Publication No. 2016/0276205 filed on Nov. 12, 2015 which is hereby incorporated herein in its entirety.

Use of the present disclosure may offer several advantages. First, the large size of the mirror assembly 56 allows for a large mirror 68 to be utilized within the vehicle 40 while decreasing the space required for the mirror assembly 56. Second, the illuminating the mirror 68 using the light assembly 76 allows for the mirror assembly 56 to offer a variety of unique lighting solutions. Third, use of the retaining and engaging members 48, 72 allow for the mirror assembly 56 to remain in a deployed position. Fourth, use of the roller 60 allows the shade 64 to deploy from a concealed position within the headliner 52. Use of the compressed region 52A allows for the largest roller 60 to be utilized such that fatigue and stress to not harm the shade 64.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:
1. A vehicle, comprising:
a seating assembly including a retaining member;
a headliner positioned above the seating assembly; and
a mirror assembly positioned within the headliner and comprising:

a roller;

a shade coupled to the roller and deployable from the headliner;

a mirror positioned on the shade;

an engaging member coupled to the shade; and a light source positioned on the shade.

2. The vehicle of claim 1, further comprising:

a photoluminescent structure positioned on the shade proximate the light source.

3. The vehicle of claim 1, wherein the light source is positioned on opposite side of shade from the mirror.

4. The vehicle of claim 1, wherein the light source is configured to emit light through the shade.

5. The vehicle of claim 1, wherein the light source is positioned behind the mirror.

6. The vehicle of claim 5, wherein the light source emits light through the mirror.

7. The vehicle of claim 1, wherein the light source emits light in a vehicle rearward direction.

8. The vehicle of claim 7, wherein the light source is configured to emit different colors of light.

9. The vehicle of claim 1, further comprising:

a stiffening film applied to the light source.

10. A vehicle, comprising:

a seating assembly including a retaining member;

a headliner positioned above the seating assembly; and a mirror assembly positioned within the headliner and comprising:

a roller;

a shade coupled to the roller and deployable from the headliner;

an engaging member coupled to the shade and configured to engage the retaining member; and a mirror positioned on the shade.

11. The vehicle of claim 10, wherein the engaging member is positioned on a bottom of the shade.

12. The vehicle of claim 10, wherein the retaining member is deployable from the seat.

13. The vehicle of claim 10, wherein the retaining member is positioned on a seat back of the seating assembly.

14. The vehicle of claim 10, wherein the mirror comprises a vacuum metalized layer.

15. A vehicle, comprising:

a headliner; and a mirror assembly positioned within the headliner and comprising:

a roller;

a shade coupled to the roller and deployable from the headliner;

a mirror positioned on the shade; and a light source positioned on the shade.

16. The vehicle of claim 15, wherein the headliner is compressed proximate the roller.

17. The vehicle of claim 15, wherein the mirror comprises a vacuum metalized layer.

18. The vehicle of claim 15, further comprising:

a photoluminescent structure positioned on shade assembly proximate the light source.

19. The vehicle of claim 15, wherein the light source at least partially surrounds a perimeter of the mirror.

20. The vehicle of claim 15, wherein the light source is configured to emit different colors of light.

* * * * *